United States Patent
Murthy et al.

(10) Patent No.: US 7,096,224 B2
(45) Date of Patent: Aug. 22, 2006

(54) MECHANISM FOR MAPPING XML SCHEMAS TO OBJECT-RELATIONAL DATABASE SYSTEMS

(75) Inventors: Ravi Murthy, Fremont, CA (US); Muralidhar Krishnaprasad, Foster City, CA (US); Sivasankaran Chandrasekar, Palo Alto, CA (US); Eric Sedlar, San Francisco, CA (US); Viswanathan Krishnamurthy, Fremont, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 419 days.

(21) Appl. No.: 10/259,278

(22) Filed: Sep. 27, 2002

(65) Prior Publication Data

US 2003/0140308 A1 Jul. 24, 2003

Related U.S. Application Data

(60) Provisional application No. 60/378,800, filed on May 7, 2002, provisional application No. 60/326,052, filed on Sep. 28, 2001.

(51) Int. Cl.
G06F 17/00 (2006.01)
G06F 7/00 (2006.01)
(52) U.S. Cl. .................. 707/100; 707/101; 707/102
(58) Field of Classification Search ........... 707/2–6, 707/10, 100–103 R, 104.1; 709/202–203, 709/219, 246; 715/513–514, 516–517
See application file for complete search history.

(56) References Cited

U.S. PATENT DOCUMENTS 5,295,261 A  3/1994  Simonetti ................. 395/600
5,404,513 A  4/1995  Powers et al.

(Continued)

FOREIGN PATENT DOCUMENTS

WO    WO 00/49533    8/2000

(Continued)

OTHER PUBLICATIONS

R. Bourret et al.: A generic Load/Extract Utility for Data Transfer Between XML Documents and Relational Databases, Jun. 8-9, 2000, IEEE computing SOC., pp. 134-143.*

(Continued)

*Primary Examiner*—Greta Robinson
*Assistant Examiner*—Jacques Veillard
(74) *Attorney, Agent, or Firm*—Marcel K. Bingham; Hickman Palermo Truong & Becker LLP

(57) ABSTRACT

A method and system are provided for allowing users to register XML schemas in a database system. The database system determines, based on a registered XML schema, how to store within the database system XML documents that conform to the XML schema. This determination involves mapping constructs defined in the XML schema to constructs supported by the database system. Such constructs may include datatypes, hierarchical relationship between elements, constraints, inheritances, etc. Once the mapping has been determined, it is stored and used by the database system to determine how to store subsequently received XML documents that conform to the registered XML schema.

72 Claims, 10 Drawing Sheets

U.S. PATENT DOCUMENTS

| | | | |
|---|---|---|---|
| 5,467,471 A | 11/1995 | Bader | 395/600 |
| 5,680,614 A | 10/1997 | Bakuya et al. | |
| 5,724,577 A | 3/1998 | Exley et al. | 395/611 |
| 5,734,887 A | 3/1998 | Kingberg et al. | 395/604 |
| 5,974,407 A | 10/1999 | Sacks | |
| 5,987,506 A | 11/1999 | Carter et al. | |
| 6,038,563 A | 3/2000 | Bapat et al. | |
| 6,055,544 A | 4/2000 | DeRose et al. | |
| 6,061,684 A | 5/2000 | Glasser et al. | |
| 6,128,610 A | 10/2000 | Srinivasan et al. | |
| 6,141,655 A | 10/2000 | Johnson et al. | |
| 6,154,741 A | 11/2000 | Feldman | |
| 6,199,195 B1* | 3/2001 | Goodwin et al. | 717/104 |
| 6,208,993 B1 | 3/2001 | Shadmone | |
| 6,236,988 B1 | 5/2001 | Aldred | |
| 6,263,332 B1* | 7/2001 | Nasr et al. | 707/5 |
| 6,269,380 B1* | 7/2001 | Terry et al. | 707/200 |
| 6,279,006 B1* | 8/2001 | Shigemi et al. | 707/101 |
| 6,279,007 B1 | 8/2001 | Uppala | |
| 6,298,349 B1 | 10/2001 | Toyoshima et al. | |
| 6,343,287 B1* | 1/2002 | Kumar et al. | 707/4 |
| 6,356,920 B1* | 3/2002 | Vandersluis | 715/501.1 |
| 6,366,934 B1* | 4/2002 | Cheng et al. | 715/513 |
| 6,370,537 B1 | 4/2002 | Gilbert et al. | |
| 6,470,344 B1 | 10/2002 | Kothuri et al. | |
| 6,487,546 B1 | 11/2002 | Witkowski | |
| 6,496,842 B1 | 12/2002 | Lyness | |
| 6,571,231 B1 | 5/2003 | Sedlar | 707/1 |
| 6,604,100 B1 | 8/2003 | Fernandez et al. | |
| 6,636,845 B1 | 10/2003 | Chau et al. | |
| 6,718,322 B1 | 4/2004 | Brye | 707/3 |
| 6,725,212 B1 | 4/2004 | Couch et al. | |
| 6,754,661 B1 | 6/2004 | Hallin et al. | 707/100 |
| 6,772,350 B1 | 8/2004 | Belani et al. | |
| 6,785,673 B1* | 8/2004 | Fernandez et al. | 707/3 |
| 6,836,778 B1 | 12/2004 | Manikutty et al. | |
| 2002/0184401 A1 | 12/2002 | Kadel, Jr. et al. | |
| 2003/0004937 A1 | 1/2003 | Salmenkaita et al. | |
| 2003/0009361 A1 | 1/2003 | Hancock et al. | |
| 2003/0065659 A1 | 4/2003 | Agarwal et al. | |
| 2003/0093672 A1 | 5/2003 | Cichowlas | |
| 2003/0101194 A1 | 5/2003 | Rys et al. | |
| 2003/0172135 A1 | 9/2003 | Bobick et al. | |
| 2003/0182624 A1* | 9/2003 | Large | 715/513 |
| 2004/0043758 A1 | 3/2004 | Sorvari et al. | |
| 2004/0064466 A1 | 4/2004 | Manikutty et al. | |
| 2004/0176958 A1 | 9/2004 | Salmenkaita et al. | |
| 2004/0220912 A1 | 11/2004 | Manikutty et al. | |
| 2004/0220927 A1 | 11/2004 | Murthy et al. | |
| 2004/0225680 A1 | 11/2004 | Cameron et al. | |
| 2005/0010896 A1 | 1/2005 | Meliksetian et al. | |
| 2005/0050058 A1 | 3/2005 | Jain et al. | |
| 2005/0050092 A1 | 3/2005 | Jain et al. | |
| 2006/0031233 A1 | 2/2006 | Liu et al. | |

FOREIGN PATENT DOCUMENTS

| | | |
|---|---|---|
| WO | WO 01/42881 A2 | 6/2001 |
| WO | WO 01/59602 A1 | 8/2001 |
| WO | WO 01/61566 A1 | 8/2001 |

OTHER PUBLICATIONS

Hansrudi Noser, et al., "Dynamic 3D Visualization of Database-Defined Tree Structures on the WWW by Using Rewriting Systems," 2000, IEEE, XP-002262516, pp. 247-254.

Sushil Jajodia, et al., "Toward a Multilevel Secure Relational Data Model," ACM, 1991, 8393 SIGMOD Record, Jun. 20, 1991, No. 2, New York, US, XP 000364619, pp. 50-59.

R. Bourret, et al., "A Generic Load/Extract Utility for Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

S. Vorthmann, et al. "Beyond Schemas, Schema Adjuncts and the Outside World," Markup Languages, Online!, vol. 2, No. 3, Jun. 2000, pp. 1-8.

Mi-Ok Chae, et al., "Design and Implementation of an Object-Oriented Multimedia DBMS Tightly Coupled with Information Retrieval Functions," Proc. 17$^{th}$ IASTED International Conference on Applied Informatics, Feb. 15-18, 1999, abstract.

Daniele Braga et al., "A Graphical Environment to Query XML Data with Query," Proceedings of the Fourth International Conference on Web Information Systems Engineering (WISE '03), 2003, IEEE, 10 pages.

Chen, Ruey-Shun et al., "Developing an XML framework for metadata system", Trinity College Dublin, Proc. of the 1st Inter. Sympo. on Information and Communication, pp. 267-272.

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

Peng, Feng et al., "XPath queries on streaming data", 2003, ACM Press, pp. 431-442.

Vion-Dury, Jean-Yves, "XPath on left and right sides of rules: toward compact XML tree rewriting through node patterns", 2003, ACM Press, pp. 19-25.

Josephine Cheng, et al., "IBM DB2 XML Extender, An end-to-end solution for storing and retrieving XML documents.," IEEE, ICDE '00 Conference, San Diego, Feb. 2000, 128 pages.

International Preliminary Examination Report, Application No. PCT/US02/30783, pp. 1-14.

J. Shanmugasundaram, et al. "Querying XML Views of Relational Data," Proceedings of the 27$^{th}$ Very Large Databases Conference, Rome, Italy, Sep. 2001, pp. 261-270.

Current claims in PCT/US02/30783, pp. 1-8.

* cited by examiner

Entire resume value is stored in the CLOB

FIG. 7

.
.
.
<element name = "Addr" xdb : SQLType = "CLOB">
.
.
.

| Employee_tab of type OBJ_T | | |
|---|---|---|
| Name | Age | Addr |
| ≈≈≈ | ≈≈≈ | CLOB |
| ≈≈≈ | ≈≈≈ | ≈≈≈≈≈≈ |

Street and city are stored in the CLOB

MECHANISM FOR MAPPING XML SCHEMAS TO OBJECT-RELATIONAL DATABASE SYSTEMS

RELATED APPLICATIONS

The present application claims priority from the following U.S. Provisional Patent Applications, the entire contents of which are incorporated herein by reference for all purposes:

U.S. Provisional Patent Application No. 60/326,052, filed on Sep. 28, 2001, entitled File Based Access Provided With a Database System, by Eric Sedlar and Viswanathan Krishnamurthy;

U.S. Provisional Patent Application No. 60/378,800, filed on May 7, 2002, entitled SQL Access to Data that Provides a File System Abstraction, by Nipun Agarwal, Ravi Murthy, Eric Sedlar, Sivasankaran Chandrasekar, Fei Ge, Syam Pannala, Neema Jalali and Muralidhar Krishnaprasad.

The present application is also related to the following U.S. patent applications, the entire contents of which are incorporated herein by reference for all purposes:

U.S. patent application Ser. No. 10/260,138, filed on the equal day herewith, entitled OPERATORS FOR ACCESSING HIERARCHICAL DATA IN A RELATIONAL SYSTEM, by Nipun Agarwal, Ravi Murthy, Eric Sedlar, Sivasankaran Chandrasekar and Fei Ge;

U.S. patent application Ser. No. 10/260,384, filed on the equal day herewith, entitled PROVIDING A CONSISTENT HIERARCHICAL ABSTRACTION OF RELATIONAL DATA, by Nipun Agarwal, Eric Sedlar, Ravi Murthy and Namit Jam;

U.S. patent application Ser. No. 10/260,161, filed on the equal day herewith, entitled INDEXING TO EFFICIENTLY MANAGE VERSIONED DATA IN A DATABASE SYSTEM , by Nipun Agarwal, Eric Sedlar and Ravi Murthy;

U.S. patent application Ser. No. 10/256,524, filed on the equal day herewith, entitled MECHANISMS FOR STORING CONTENT AND PROPERTIES OF HIERARCHICALLY ORGANIZED RESOURCES, by Ravi Murthy, Eric Sedlar, Nipun Agarwal, and Neema Jalali;

U.S. patent application Ser. No. 10/259,176, filed on the equal day herewith, entitled MECHANISM FOR UNIFORM ACCESS CONTROL IN A DATABASE SYSTEM, by Ravi Murthy, Eric Sedlar, Nipun Agarwal, Sam Idicula, and Nicolas Montoya;

U.S. patent application Ser. No. 10/256,777, filed on the equal day herewith, entitled LOADABLE UNITS FOR LAZY MANIFESTATION OF XML DOCUMENTS by Syam Pannala, Eric Sedlar, Bhushan Khaladkar, Ravi Murthy, Sivasankaran Chandrasekar, and Nipun Agarwal;

U.S. patent application Ser. No. 10/260,38 1, filed on the equal day herewith, entitled MECHANISM TO EFFICIENTLY INDEX STRUCTURED DATA THAT PROVIDES HIERARCHICAL ACCESS IN A RELATIONAL DATABASE SYSTEM, by Neema Jalali, Eric Sedlar, Nipun Agarwal, and Ravi Murthy.

FIELD OF THE INVENTION

The present invention relates to techniques for storing XML data in a database system.

BACKGROUND OF THE INVENTION

Within a relational database system, data is stored in various types of data containers. Such data containers typically have a structure. The structure of a container is imposed on the data it contains. For example, tables are organized into rows and columns. When data is stored in a table, individual data items within the data are stored in the specific rows and columns, thus imposing a structure on the data.

Typically, the structure imposed on the data corresponds to logical relationships within the data. For example, all values stored within a given row of a table will typically have some logical relationship to each other. For example, all values within a given row of an employee table may correspond to the same employee.

Outside of database systems, the degree to which electronic data is structured may vary widely based on the nature of the data. For example, data stored in spreadsheets is generally highly structured, while data representing visual images is generally highly unstructured.

XML (eXtensible Markup Language) is becoming increasingly popular as the format for describing and storing all forms of data. Thus, providing support for storing, searching and manipulating XML documents is an extremely important problem for data management systems today.

Information about the structure of specific types of XML documents may be specified in documents referred to as "XML schemas". For example, the XML schema for a particular type of XML document may specify the names for the data items contained in that particular type of XML document, the hierarchical relationship between the data items contained in that type of XML document, datatypes of the data items contained in that particular type of XML document, etc.

Unfortunately, although XML documents are structured, the structure of XML documents is largely ignored by database systems when database systems are used to store XML documents. For example, a highly structured XML document, containing multiple values for multiple attributes, may simply be stored as if it were an atomic undifferentiated piece of data in a single CLOB column of a table. When XML documents are stored in this fashion, the performance and scalability features of the database cannot be fully exploited to access the XML data.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7 shows complexType XML fragments mapped to character large objects (CLOBs);

DETAILED DESCRIPTION OF EMBODIMENTS OF THE INVENTION

A method and system are described for mapping XML schemas to object-relational database systems. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Various techniques are described herein for managing XML data within a database system in a manner that increases the correlation between the structure imposed on the data by the database containers used to hold the data, and the structure of the XML documents from which the data originates. According to one aspect, a mechanism is provided to allow users of a database system to register XML schemas with the database system. An XML schema may be registered explicitly (via an API call) or implicitly (when an instance document conforming to the XML schema is first inserted into the database).

During the registration process for a given XML schema, the database system determines (1) an appropriate database representation for the XML schema and (2) mapping information. The "appropriate database representation" determination is a determination about how data that conforms to the XML schema should be managed by the database system. Determining the appropriate database representation for a given XML schema may involve, for example, determining the database objects, collection types, constraints, and even the indexes that are to be used by the database system to store data from XML documents that conform to the given XML schema.

The mapping information indicates the mapping between the constructs included in the XML schema and the constructs included in the appropriate database representation. The mapping information may indicate, for example, that data associated with a specific element of the XML schema should be stored in a particular column of a table that is generated as part of the appropriate database representation. Typically, the appropriate database representation and the mapping information are generated so as to create a high correlation between the structure described in the XML schema and the structure imposed on the data by the database containers in which the XML data is stored.

System Overview

Figure 1:
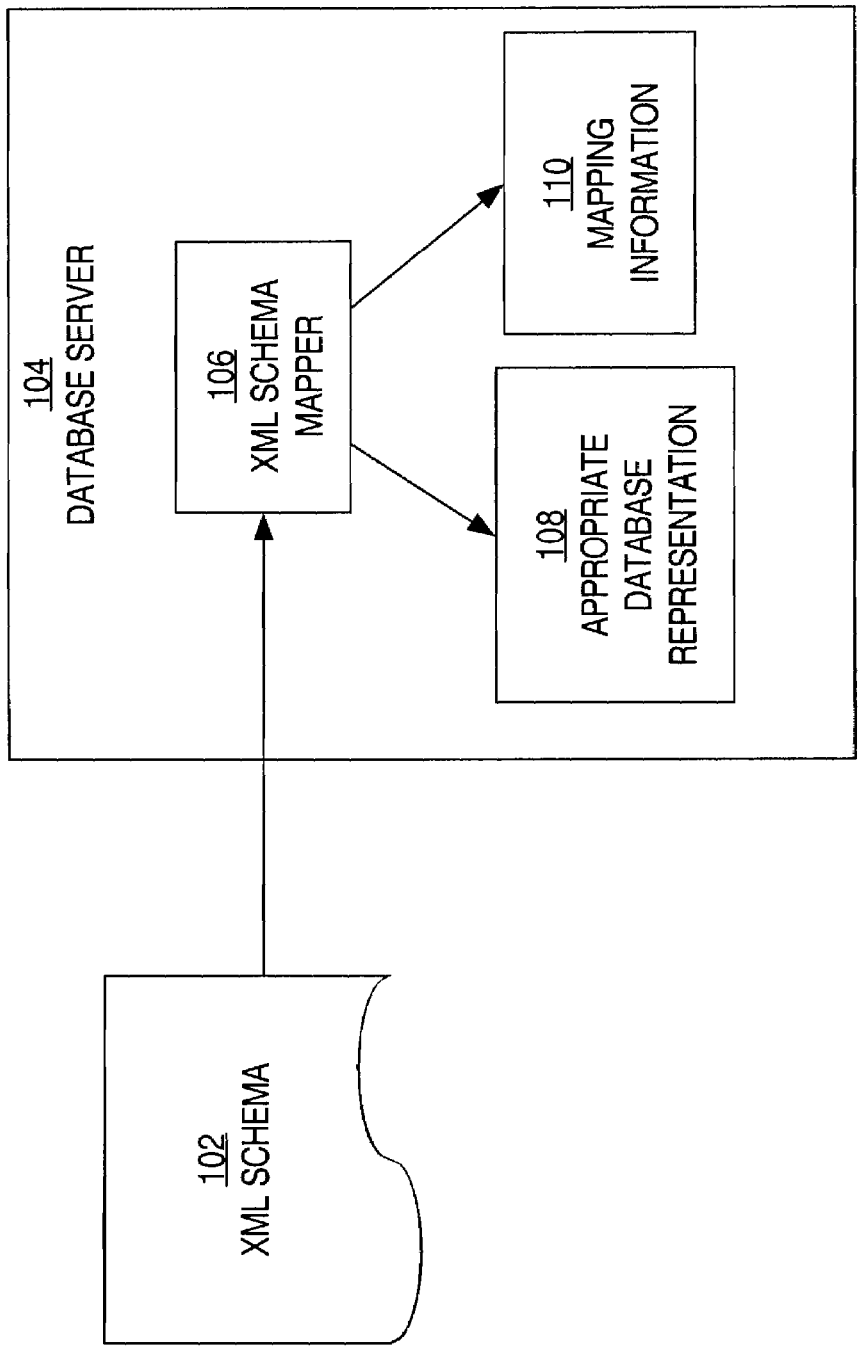
FIG. 1 is a block diagram of a database system that includes a mechanism for mapping constructs contained in XML schemas to object-relational constructs, according to an embodiment of the invention.

FIG. 1 is a block diagram of a system that includes a mechanism for mapping XML schemas to object-relational database systems. Specifically, a database server 104 (also referred to herein as "XDB") includes an XML schema mapper 106. When an XML schema 102 is registered with database server 104, XML schema mapper 106 determines the appropriate database representation 108 for documents that conform to the XML schema 102, and generates mapping information 110 that indicates the correlation between the elements of the XML schema and the elements of the appropriate database representation 108.

According to one embodiment, database server 104 is configured to:

Register any W3C compliant XML schema

Perform validation of XML documents against a registered XML schema

Register both local and global schemas

Generate XML schemas from object types

Support re-registering a XML schema (as a mechanism for manual schema evolution)

Support implicit registration of XML schema when documents are inserted via certain APIs (e.g. FTP, HTTP)

Allow a user to reference a schema owned by another user

Allow a user to explicitly reference a global schema when a local schema exists with the same name.

Support XML schema evolution

According to one embodiment, XML schema mapper 106 is configured to:

Generate structured database mapping from XML Schemas (typically during schema registration)—this may include, for example, generation of SQL object types, collection types, etc and capturing the mapping information via schema annotations.

Allow a user to specify a particular SQL type mapping when there are multiple legal mappings Create XMLType tables and columns based on registered XML schemas DML and query support for schema-based XMLType tables

XML Schema Registration

According to one embodiment, an XML schema has to be first registered with database server 104 before it can be used or referenced within database server 104. After the registration process is completed, XML documents conforming to this schema (and referencing it via the schema URL within the document) can be handled by database server 104. Tables and/or columns can be created for root XML elements defined by this schema to store the conforming documents.

According to one embodiment, a schema is registered using a DBMS_XMLSCHEMA package by specifying the schema document and its URL (also known as schema location). Note that the URL used here is simply a name that uniquely identifies the registered schema within the database—and need not be the physical URL at which the schema document is located. Further, the target namespace of the schema is another URL (different from the schema location URL) that specifies an "abstract" namespace within which the elements and types get declared. An instance document should specify both the namespace of the root element and the location (URL) of the schema that defines this element.

For example consider the XML Schema shown below. It declares a complexType called "PurchaseOrderType" and an element "PurchaseOrder" of this type.

```
<schema xmlns="http://www.w3.org/2001/XMLSchema"
targetNamespace="http://www.oracle.com/PO.xsd">
    <complexType name = "PurchaseOrderType">
        <attribute name = "PurchaseDate" type = "date"/>
        <sequence>
            <element name = "PONum" type = "decimal"/>
            <element name = "Company" type = "string" maxLength =
                "100"/>
            <element name = "Item" maxOccurs = "1000">
                <complexType>
                    <sequence>
                        <element name = "Part" type = "string"
                            maxLength = "1000"/>
                        <element name = "Price" type = "float"/>
                    </sequence>
                </complexType>
            </element>
        </sequence>
    </complexType>
    <element name="PurchaseOrder" type="PurchaseOrderType"/>
</schema>
```

The following statement registers this schema at URL "http://www.oracle.com/PO.xsd". (doc is a variable holding the above schema text).

dbms_xmlschema.registerSchema('http://www.oracle.com/PO.xsd', doc);

As shall be described in greater detail hereafter, a registered XML Schema can be used to create schema-based XMLType tables and columns. The following is an XMLType instance that conforms to the above XML schema. The schemaLocation attribute specifies the schema URL.

<PurchaseOrder xmlns="http://www.oracle.com/PO.xsd"
     xmlns:xsi="http://www.w3.org/2001/XMLSchema-instance"
     xsi:schemaLocation="http://www.oracle.com/PO.xsd
  http://www.oracle.com/PO.xsd"

```
           PurchaseDate="01-JAN-2001">
    <PONum>1001</PONum>
    <Company>Oracle Corp</Company>
    <Item>
        <Part>9i Doc Set</Part>
        <Price>2550</Price>
    </Item>
</PurchaseOrder>
```

According to one embodiment of the invention, XML schema registration includes (1) schema validation, (2) determination of appropriate data structures, and (3) generation of mapping information. Each of these phases shall be described in greater detail hereafter.

XML Schema Validation

XML schemas describe the structure of a particular type of XML document. However, XML schemas are themselves XML documents that must conform to the structure specified in an XML schema. Specifically, each XML schema must conform to the structure described in the XML schema document associated with the XML schema document type. During the schema validation phase of XML schema registration, the XML schema that is being registered is inspected to verify that the XML schema conforms to the structure specified in the XML schema associated with the XML schema document type.

Determination of Appropriate Database Representation

As mentioned above, the appropriate database representation determination is a determination about how data that conforms to an XML schema should be managed by the database system. According to one embodiment, the appropriate database representation is selected to achieve a high correlation between (1) the structure imposed on data by the XML document in which the data is contained, and the (2) the structure imposed on the data by a database system.

The ability to achieve a high correlation depends, at least in part, on the capabilities of the database system. The specific capabilities of database systems vary from vendor to vendor and version to version. While certain capabilities are common to most database systems, other capabilities are not. Thus, while embodiments of the present invention shall be described herein in the context of a database system with a specific set of capabilities, the invention is not limited to database systems that possess those specific capabilities.

According to one embodiment, the determination of the appropriate database representation is performed based on a set of general rules, governing the operation of XML schema mapper 106, about how to map each type of construct that may be encountered in an XML schema to a corresponding construct supported by the target object-relational database system. The rules may be hard-coded into the logic of XML schema mapper 106, or represented in metadata that is used by XML schema mapper 106. According to one embodiment, the general rules address the following issues:

How to map datatypes supported by XML to datatypes supported by the target object-relational database system;

How to map the structure defined by an XML schema to a database object with a similar structure;

How to map constraints supported by XML to constraint enforcing mechanisms supported by the target object-relational database system;

How to reflect, in the target object-relational database system, that the XML schema inherits from another XML schema; and How to reflect, in the target object-relational database system, other constructs supported by XML, such as substitution groups, simple content, wildcards, external references via include and import elements, etc.

Mapping XML Datatypes to Object-Relational Datatypes

An XML schema declares a set of primitive types. According to one embodiment, the rules used by the XML schema mapper 106 define the datatypes, supported by the target database system, to which each of the XML datatypes correspond. For example, in one embodiment, the XML datatype "string" maps to either of VARCHAR or CLOB SQL datatypes. In this example, the XML schema mapper 106 may choose whether to map a particular string element to a VCHAR or CLOB based, for example, on any length constraints that could be declared, for the string element, in the XML schema. Numerous examples of the datatype-to-datatype mapping rules that XML schema mapper 106 may use are presented hereafter, and described in Appendix I.

Mapping XML Structure to Database Objects

SQL schemas describe the structure of an element in terms of the elements and attributes that can appear within it. The rules that map XML structure to database objects indicate how to map an SQL object type with attributes corresponding to the XML attributes and elements defined within the XML schema. For example, an XML element A containing attribute X and elements Y and Z, will map to an object type with three attributes: X, Y and Z.

Mapping XML Constraints to Database Constraints

XML schemas can specify various forms of constraints. Such constraints, when encountered by XML schema mapper 106, are mapped to the appropriate constraint mechanisms in SQL. For example, the length constraint for a "string" attribute defined in an XML schema may be maxlength="20". According to one embodiment, such a constraint would cause the string attribute to be mapped to the data type VARCHAR2(20).

Another type of constraint that can be applied to XML elements is a constraint that specifies a maximum number of occurrences of the element. When the maximum number is greater than one, the element can be mapped to an array type supported by the target database system (e.g. VARRAY). The number of occurrences specified for the XML constraint dictates the cardinality of the VARRAY.

Other types of constraints that may be specified for elements of an XML schema, and reflected in corresponding constraints in the appropriate database representation, include uniqueness constraints, referential integrity constraints, not null constraints, etc.

Mapping Inheritance

The XML schema model allows for inheritance of complex types. According to one embodiment, when an XML schema makes use of the inheritance construct, the inheritance is mapped to the SQL object inheritance mechanisms supported by the target database system. For example, within an XML schema, an XML complexType "USAddress" can be declared as an extention of another complexType "Address". In response, within the appropriate database representation, an SQL object type "USAddress" is declared as a subtype of the SQL object type that corresponds to "Address".

Local and Global Schemas

By default, an XML schema belongs to the user performing the registration. A reference to the XML schema document is stored within the XDB hierarchy within the directory /sys/schemas/<username>/ . . . . For example, if the user SCOTT registered the above schema, it gets mapped to the file /sys/schemas/SCOTT/www.oracle.com/PO.xsd Such schemas are referred to as local schemas. In general, they are usable only by the user to whom it belongs. Note that there is no notion of qualifying the schema URL with a database user name, because the schema location appearing in instance XML documents are simply URLs. Thus, only the owner of the schema can use it in defining XMLType tables, columns or views, validating documents, etc.

In contrast to local schemas, privileged users can register a XML schema as a global schema—by specifying an argument to dbms_xmlschema registration function. Global schemas are visible to all users and are stored under /sys/schemas/PUBLIC/ . . . . directory within the XDB hierarchy. Note that the access to this directory is controlled by ACLs—and by default, is write-able only by DBA. A user needs to have write privileges on this directory to be able to register global schemas.

A user can register a local schema with the same URL as an existing global schema. A local schema always hides any global schema with the same name(URL).

A user can register a link to an existing schema—potentially owned by some other user. The schema link is identified by its URL. The schema link URL can then be used wherever a schema URL is expected. e.g. creating a xmltype table. The reference to the schema link gets translated to the underlying schema at the time of reference. If a user has a local schema with the same name as a global schema, there is a mechanism that allows the user to explicitly reference the global schema. The user can register a link (with a different name) to the global schema.

Deleting XML Schemas

According to one embodiment, an XML Schema can be deleted by using the dbms_xmlschema.deleteSchema procedure. When a user tries to delete a schema, the database server first checks for its dependents. If there are any dependents, the database server raises an error and the deletion operation fails. A FORCE option is provided while deleting schemas—if the user specifies the FORCE option, the schema deletion will proceed even though it fails the dependency check. In this mode, schema deletion will mark all its dependents as invalid.

Dependency Model for XML Schemas

According to one embodiment, the following objects "depend" on a registered XML schema:
Tables/Views that have a XMLType column that conforms to some element in this schema.
XML schemas that include or import this schema as part of their definition
Cursors that reference the schema name for eg. within XMLGEN operators. (Note: These are purely transient objects)
The following operations result in dependencies being added on a XML schema object:
Schema registration: Add dependencies on all included/ imported schemas Table/View/Cursor creation: Add dependency from table/view/cursor on the referenced xml schema object.

Transactional Behavior

According to one embodiment, the registration of a schema is non-transactional and auto-committed similar to other SQL DDL operations. If the registration is successful, the operation is auto-committed. However, if the registration fails, the database is rolled back to the state before the registration began. Since the schema registration process potentially involve creating object types and tables, the error recovery involves dropping any such created tables and types. Thus, the entire schema registration is guaranteed to be atomic i.e. it either succeeds or else the database is restored to the state before the start of registration.

XML Schema Evolution

A user may evolve a registered XML schema by re-registering it and providing the new XML schema document. The dbms_xmlschema.registerSchema function can be used to re-register the XML schema. This operation always succeeds if there are no XMLType tables that depend on this schema (XMLType views are okay). According to one embodiment, if there are any dependent XMLType tables, database server 104 requires that the input schema document contain the complete SQL mapping annotations—and that they represent a valid mapping applicable to all such XMLType tables.

Example—Changing the names of elements or attributes: The user retrieves the registered schema document, makes the needed modifications and re-registers it. Note that this alteration does not affect the underlying tables.

Example—Adding a new element or attribute: Since this alteration affects underlying tables, it has to be performed in multiple steps. The user first uses the ALTER TYPE and/or ALTER TABLE commands to evolve the underlying tables. This marks the XML schema as invalid. The user then modifies the XML schema document as appropriate and re-registers it.

According to one embodiment, a 1-step XML schema evolution is provided, i.e. a user simply inputs a new XML schema and all underlying type and table alterations are determined implicitly.

Implicit Registration of XML Schemas

When instance documents are inserted into XDB via protocols such as HTTP or FTP, the schemas to which they conform (if specified) are registered implicitly—if not already registered. Since the schema registration is always auto-committed, the implicit registration is performed within an autonomous transaction.

XMLType Tables

Tables and columns that are part of the "appropriate database representation" of an XML schema are referred to herein as "schema-based" tables and columns. According to one embodiment, Schema-based XMLType tables and columns can be created by referencing the schema URL (of a registered schema) and the name of the root element. A subset of the XPointer notation (shown below) can also be used in providing a single URL containing both the schema location and the element name.

```
CREATE TABLE po_tab OF xmltype
    XMLSCHEMA "http://www.oracle.com/PO.xsd" ELEMENT "PurchaseOrder"
An equivalent definition is
    CREATE TABLE po_tab of xmltype
        element "http://www.oracle.com/PO.xsd#PurchaseOrder";
```

By default, schema-based XMLType is stored in an underlying (hidden) object type column. The SQL object types can be created (optionally) during the schema registration process. The mapping from XML to SQL object types and attributes is itself stored within the XML schema document as extra annotations i.e. new attributes defined by XDB.

Schema-based XMLType can also be stored in a single underlying LOB column.

```
CREATE TABLE po_tab OF xmltype
    STORE AS CLOB
        ELEMENT    "http://www.oracle.com/PO.xsd#PurchaseOrder";
```

Creation of SQL Object Types

According to one embodiment, when an XML schema is registered, database server 104 creates the appropriate SQL object types that enable a structured storage of XML documents conforming to this schema. All SQL object types are created in the current user's schema (by default). For example, when PO.xsd is registered, the following SQL types are created.

```
create type Item_t as object
(
    part varchar2(1000),
    price number
);
create type Item_varray_t as varray(1000) of OBJ_T1;
create type PurchaseOrder_t as object
(
    purchasedate date,
    ponum number,
    company varchar2(100),
    item Item_varray_t
);
```

The names of the object types and attributes above may actually be system-generated. If the schema already contains the SQLName attribute filled in, this name is used as the object attribute's name. Else, the name is derived from the XML name—unless it cannot be used because of length, or conflict reasons. If the SQLSchema attribute is filled in, Oracle will attempt to create the type in the specified schema. The current user must have any necessary privileges to perform this operation.

Mapping XML Schemas to Object Types—a Detailed Example

The following sections provide the details on how the SQL object types may be generated from the XML schema information. As was mentioned above, the actual mapping rules may vary from implementation to implementation based on a variety of factors. One such factor is the capabilities of the target database system. In the following detailed example, it is assumed that the target database system supports the data types and object typing mechanisms currently available in the Oracle 9iR2, currently available from Oracle Corporation.

Mapping Simple Types

According to one embodiment, an XML primitive type is mapped to the closest SQL datatype. For example, decimal, positive Integer and float are all mapped to SQL NUMBER. An XML enumeration type is mapped to an object type with a single RAW(n) attribute—the value of n is determined by the number of possible values in the enumeration declaration. An XML list or union datatype is mapped to a string (VARCHAR2/CLOB) datatype in SQL.

| | | Default mapping of XML simple types to SQL | | | |
|---|---|---|---|---|---|
| XML simple type | Length/ Precision | MaxLength/ Scale | Default Oracle datatype | Compatible datatypes | Comments |
| string | | n (n < 4000) | VARCHAR2(n) | NVARCHAR2, CHAR, CLOB, NCHAR, NCLOB | n < 2000 for UTF-16 encoding |
| string | m (m < 4000) | | CHAR(n) | VARCHAR2, NVARCHAR2, CLOB, NCHAR, NCLOB | n < 2000 for UTF-16 encoding |
| string | m (m > 4000) | | CLOB | VARCHAR2, NVARCHAR2, CHAR, NCHAR, NCLOB | n > 2000 for UTF-16 encoding |
| string | | n (n > 4000) | CLOB | VARCHAR2, NVARCHAR2, CHAR, NCHAR, NCLOB | n > 2000 for UTF-16 encoding |
| boolean | | | RAW(1) | | Values MUST be 0 or 1. |
| float | | | FLOAT | NUMBER, DOUBLE | |
| double | | | DOUBLE | NUMBER | |
| decimal | precision m | scale n | NUMBER(m,n) | | If m & n == 0, then map to NUMBER |
| timeInstant | | | TIMESTAMP | TIME?? | Timestamp in XML can map to the format CCYY-MM-DDThh-mm-ss.sss |
| timeDuration | | | INTERVAL | TIMESTAMP?? | XML duration supports PnYnMnDTnHnMnnS format from ISO 8601. |
| recurringDuration | | | INTERVAL | | |
| binary | m (m < 4K) | OR n, n<4K | RAW(m) or RAW(n) | BLOB | |
| binary | m (m > 4K) | OR n, n>4K | BLOB | RAW | length or maxlength > 4K |
| uri | | | UriType (VARCHAR2) | NVARCHAR2, CLOB, NCHAR, CHAR, NCLOB | Length or uri must be less than 4K Or 2K for UTF-16.. |

| | Default XML Datatype Mapping to SQL (for simple Types) (CONTD) | | | |
|---|---|---|---|---|
| XML simpleType | Default Oracle Type | Compatible Types | | Comments |
| Language (string) | VARCHAR2(4000) | NVARCHAR2, CLOB,CHAR, NCLOB, NCHAR | | 2000 for UTF-16 (for all) |
| NMTOKEN (string) | VARCHAR2(4000) | NVARCHAR2, CLOB,CHAR, NCLOB, NCHAR | | " " |
| NMTOKENS (string) | VARCHAR2(4000) | NVARCHAR2, CLOB,CHAR, NCLOB, NCHAR | | " " |
| Name (string) | VARCHAR2(4000) | NVARCHAR2, CLOB,CHAR, NCLOB, NCHAR | | A generic XML Name |
| NCName (string) | VARCHAR2(4000) | NVARCHAR2, CLOB,CHAR, NCLOB, NCHAR | | Represents an non-colon'ized name |
| ID | VARCHAR2(4000) | NVARCHAR2, CLOB,CHAR, NCLOB, NCHAR | | Unique throughout the document |
| IDREF | VARCHAR2(4000) | NVARCHAR2, CLOB,CHAR, NCLOB, NCHAR | | Must match an ID in the document |
| IDREFs | VARCHAR2(4000) | NVARCHAR2, CLOB,CHAR, NCLOB, NCHAR | | |
| ENTITY | VARCHAR2(4000) | NVARCHAR2, CLOB,CHAR, NCLOB, NCHAR | | |

-continued

| | | | |
|---|---|---|---|
| ENTITIES | VARCHAR2(4000) | NVARCHAR2, CLOB,CHAR, NCLOB, NCHAR | |
| NOTATION | VARCHAR2(4000) | NVARCHAR2, CLOB,CHAR, NCLOB, NCHAR | |
| QName | XDB.XDB$QNAME | | Represents a qualified XML name. Stored an an object type with two attributes - the unqualified name string and the index number of the namespace into the global namespace array. |
| integer | INTEGER | INT, NUMBER | |
| nonNegativeInteger | INTEGER | INT, NUMBER | |
| positiveInteger | INTEGER | INT, NUMBER | |
| nonPositiveInteger | INTEGER | INT, NUMBER | |
| negativeInteger | INTEGER | INT, NUMBER | |
| date | DATE | TIMESTAMP | |
| time | TIMESTAMP | DATE | |

Mapping Complex Types

According to one embodiment, a complextype is mapped to an object type. XML attributes declared within the complexType map to object attributes—the simpleType defining the XML attribute determines the SQL datatype of the corresponding attribute. XML elements declared within the complexType are also mapped to object attributes. The datatype of the object attribute is determined by the simpleType or complexType defining the XML element.

If the XML element is declared with maxOccurs attribute's value>1, it is mapped to a collection attribute in SQL. The collection could be either a VARRAY (default) or nested table (if the maintainOrder attribute is set to FALSE). Further, the default storage of the VARRAY is in tables (OCTs) [OCT-FS] instead of LOBs—the user can choose the LOB storage by setting the storeAsLob attribute to TRUE.

In general, the name of the SQL attribute is generated from the XML element or attribute name using the following algorithm:
1. use XML element/attribute name (truncated to 30 chars)
2. if an illegal SQL character is found, map it to underscore ('_')
3. if this name is not unique, append a sequence number (note: this may require further truncating the name before appending the number) However, the user can explicitly specify the SQL attribute name by providing a value for the SQLName attribute within the schema

Dom Fidelity

All elements and attributes declared within the XML schema get mapped to separate attributes within the corresponding SQL object type. However, there are some pieces of information in the XML instance documents that are not represented directly by such element/attributes. Examples are:

Comments

Namespace declaration

Prefix information

In order to guarantee that the returned XML documents are identical to the original document for purposes of DOM traversals (referred to as DOM fidelity), a binary attribute called SYS_XDBPD$ is added to all generated SQL object types. This attribute stores all pieces of information that cannot be stored in any of the other attributes—thereby ensuring DOM fidelity of XML documents stored in the database system. Note: The SYS_XDBPD$ attribute is omitted in many examples for reasons of clarity. However, the attribute is may be present in all SQL object types generated by the schema registration process.

SQL Out of Line Storage

According to one embodiment, by default, a sub-element is mapped to an embedded object attribute. However, there may be scenarios where an out-of-line storage offers better performance. In such cases the SQLInline attribute can be set to FALSE—and the XML schema mapper 106 generates an object type with an embedded REF attribute. The REF points at another instance of XMLType that corresponds to the XML fragment that gets stored out-of-line. Default tables (of XMLType) are also created to store the out-of-line fragments.

EXAMPLE

```
<complexType name = "Employee"> -- OBJ_T2
    <sequence>
        <element name = "Name" type = "string" maxLength = "1000"/>
        <element name = "Age" type = "decimal"/>
        <element name = "Addr" SQLInline = "false">
            <complexType> -- OBJ_T1
                <sequence>
                    <element name = "Street" type = "string" maxLength = "100"/>
                    <element name = "City" type = "string" maxLength = "100"/>
```

-continued

```
        </sequence>
      </complexType>
    </element>
  </sequence>
</complexType>
create type OBJ_T1 as object
(
    Street varchar2(100),
    City varchar2(100)
);
create type OBJ_T2 as object
(
    Name varchar2(100),
    Age number,
    Addr REF XMLType
);
```

Mapping XML Fragments to Lobs

A user can specify the SQLType for a complex element as LOB(CLOB/BLOB) in which case, the entire XML fragment gets stored in a LOB attribute. This is useful in scenarios where some portions of the XML document are seldom queried upon, but are mostly retrieved and stored as a single piece. By storing the fragment as a LOB, the parsing/decomposition/recomposition overhead is reduced.

EXAMPLE

```
<complexType name = "Employee"> -- OBJ_T
    <sequence>
        <element name = "Name" type = "string" maxLength = "1000"/>
        <element name = "Age" type = "decimal"/>
        <element name = "Addr" SQLType = "CLOB">
            <complexType>
                <sequence>
                    <element name = "Street" type = "string" maxLength = "100"/>
                    <element name = "City" type = "string" maxLength = "100"/>
                </sequence>
            </complexType>
        </element>
    </sequence>
</complexType>
create type OBJ_T as object
(
    Name varchar2(100),
    Age number,
    Addr CLOB
);
```

Mapping Simple Content

A complexType based on a simpleContent declaration is mapped to an object type with attributes that correspond to the XML attributes and an extra SYS_XDBBODY$ attribute corresponding to the body value. The datatype of the body attribute is based on the simpleType which defines the body's type.

EXAMPLE

```
<complexType>
    <simpleContent>
        <restriction base = "string" maxLength = "1000">
            <attribute name = "a1" type = "string" maxLength = "100"/>
        </restriction>
    </simpleContent>
</complexType>
create type OBJ_T as object
(
    a1 varchar2(100),
    SYS_XDBBODY$ varchar2(1000)
);
```

Mapping Any/Any AttributE any element declarations and anyAttribute attribute declarations are mapped to LOBs in the object type. The LOB stores the text of the XML fragment that matches the any declaration. The namespace attribute can be used to restrict the contents to belong to a specified namespace. The processContents attribute within the any element declaration indicates the level of validation required for the contents matching the any declaration.

EXAMPLE

```
<complexType name = "Employee">
    <sequence>
        <element name = "Name" type = "string" maxLength = "1000"/>
        <element name = "Age" type = "decimal"/>
        <any namespace = "http://www/w3.org/2001/xhtml" processContents = "skip"/>
    </sequence>
</complexType>
create type OBJ_T as object
(
    Name varchar2(100),
    Age number,
    SYS_XDBANY$ blob
);
```

Mapping Strings to SQL Varchar2 VS Clob

If the XML schema specifies the datatype to be "string" and a maxLength value of less than 4000, it gets mapped to a varchar2 attribute of the specified length. However, if the maxLength value is not specified in the XML schema, it can only be mapped to a LOB. This is sub-optimal in cases when the majority of string values are actually small—and a very small fraction of them is large enough to necessitate a LOB. The ideal SQL datatype would be varchar2(*) that would perform like varchars for small strings but can accommodate larger strings as well. Further, such columns should support all varchar functionality such as indexing, SQL functions, etc. A similar case can be made for needing a raw(*) datatype to hold unbounded binary values without loss of performance and/or functionality for the small cases.

According to an alternative embodiment, all unbounded strings are mapped to CLOBs and all unbounded binary elements/attributes are mapped to BLOBs.

Mapping Strings to SQL Varchar2 VS Nvarchar2

By default, the XML string datatype is mapped to SQL varchar2. However, the user can override this behavior in a couple of ways:
1. The user can specify SQLType to be NVARCHAR2 for a particular string element or attribute. This ensures that NVARCHAR2 is chosen as the SQL type for the particular element/attribute.
2. The user can set the mapStringToNCHAR attribute to "true" at the top of the schema declaration. This ensures that all XML strings get mapped to NVARCHAR2 (or NCLOB) datatype, unless explicitly overridden at the element level.

Creating Schema-Based XML Tables

Assuming that the XML schema identified by "http://www.oracle.com/PO.xsd" has already been registered. A XMLType table can be created to store instances conforming to the PurchaseOrder element of this schema—in an object-relational format—as follows:
create table MyPOs of xmltype
    element "http://www.oracle.com/PO.xsd#PurchaseOder";
Hidden columns are created corresponding to the object type to which the PurchaseOrder element has been mapped.

In addition, a XMLExtra object column is created to store the top-level instance data such as namespaces declarations, etc. Note: XMLDATA is a pseudo-attribute of XMLType that allows directly accessing the underlying object column.

Specifying Storage Clauses

The underlying columns can be referenced in the storage clauses by
1. object notation: XMLDATA.<attr1>.<attr2>...
2. XML notation: ExtractValue(xmltypecol, '/attr1/attr 2')
create table MyPOs of xmltype
element "http://www.oracle.com/PO.xsd#PurchaseOrder"
    lob (xmldata.lobattr) store as (tablespace . . . );
create table MyPOs of xmltype
element "http://www.oracle.com/PO.xsd#PurchaseOrder"
    lob (ExtractValue(MyPOs, '/lobattr')) store as (tablespace . . . );

Creating Indexes

As shown above, columns underlying a XMLType column can be referenced using either a object notation or a XML notation in the CREATE INDEX statements.
    create index ponum_idx on MyPOs (xmldata.ponum);
    create index ponum_idx on MyPOs p (ExtractValue
        (p, '/ponum');

Constraints

Constraints can be specified for underlying columns by using either the object or the XML notation.
    create table MyPOs of xmltype
    element                 "http://www.oracle.com/
        PO.xsd#PurchaseOrder"
    (unique(xmldata.ponum));
    create table MyPOs p of xmltype
    element
    "http://www.oracle.com/PO.xsd#PurchaseOrder" (unique
        (ExtractValu e(p , '/ponum'));

DMLS

New instances can be inserted into a XMLType table as:
insert into MyPOs values
    (xmltype.createxml('<PurchaseOrder>. . . </PurchaseOrder>'));

The XMLType table can be queried using the XPath-based SQL operators.
    select value(p) from MyPOs where extractValue(value(p), '/Company)='Oracle';

The query rewrite mechanism rewrites queries involving existsNode and extract operators to directly access the underlying attribute columns—thereby avoiding construction of the XML followed by subsequent XPath evaluation. For example, the above query gets rewritten to:

select value(p) from MyPOs where p.xmldata.company= 'Oracle';

Query Rewrite

XPath based operators (Extract, ExistNode,ExtractValue) operating on schema-based XMLType columns are rewritten to go against the underlying SQL columns. This enables further SQL optimizations that fully exploit the object-relational storage of the XML. The following kinds of XPath expressions can be translated into the underlying SQL queries:

1. Simple XPath expressions—involving traversals over object type attributes only, where the attributes are simple scalars or object types themselves. The only axes supported are the child and the attribute axes.
2. Collection traversal expressions—involve traversal of collection expressions. Only axes supported are child and attribute axes.
3. Expressions involving * axes—Transform those expressions involving the wildcard axes provided the datatypes of the resulting nodes are all coercible. (e.g. CUST/*/CUSTNAME must point to CUSTNAMEs which are all of the same or coercible datatypes).
4. Expressions involving descendant axis (//)—Transform these expressions provided the datatypes of the resulting nodes are the same or coercible.
5. All of these expressions must work with the type cache, which includes "hidden" traversals like REFs to XMLTypes etc. (for instance xdb$schema_t stores a varray of REFs to xdb$element_t and this is not directly apparent in the XPath expression or the resulting XML document).

Transformations of these XPath expressions are supported in the ExistsNode, ExtractValue and Extract usage scenarios.

Examples of Query Rewrite of XPath.

Original Query
  select * from MyPOs p
    where ExistsNode(p, ?/PO[PNAME=?PO1?]PONO?)= 1

After Rewrite of ExistsNode
  select * from MyPOs p
    where (CASE WHEN (p.xmldata.pono IS NOT NULL) AND (p.xmldata.PNAME=?PO1?)) THEN 1 ELSE 0)=1

Original Statement
  select ExtractValue(p, ?/[PNAME=?PO1']/PONO?) from MyPOs p

After Rewrite of Extract
  select (select p.xmldata.pono from dual where p.xmldata.pname=?PO1?)
  from MyPOs;

Function Rewrote Rules

EXTRACT, EXTRACTVALUE and EXISTSNODE can appear in the following positions
  In the select list, where clause predicate, group by and order by expressions in a SQL query.
  In the Index clause of a CREATE INDEX statement.
  create index foo_index on foo_tab (extractvalue(xml_col, '/PO/PONO'));
  In all these cases, the EXISTSNODE and EXTRACT operator get replaced by their definining underlying expres-sions. The XPath expressions must satisfy the conditions listed in the previous section for them to be rewritten.

In the index case, if replacing the whole operator tree results in a single column, then the index is turned into a BTree or a domain index on the column, rather than being a functional index.

Rewrite for Object/Scalar Attribute Traversals

Simple XPath traversals are rewritten into object type accessors. Predicates are handled by putting them in the where clause. Any XPath child access over an object type is translated to an object attribute access on the underlying object type. For example A/B maps to a.b where A maps to the object type a and the XPath node B maps to the attribute of "a" named "b".

This rewrite is consistent at any level of the XPath expression, i.e. whether the XPath traversal occurs within a predicate, or a location path variable.

For example,
PO/CUSTOMER/CUSTOMERNAME becomes "po"."cust"."custname" (assuming PO maps to "po" etc.)

Predicates are handled by rewriting the predicate expression in the underlying object expressions.

In the simple case, for EXISTSNODE, the main location path traversal becomes a IS NOT NULL predicate, whereas for the EXTRACT case, this becomes the actual node being extracted.

EXISTSNODE(po_col, 'PO/CUSTOMER/CUSTOMER-NAME') becomes
CASE (WHEN ("po"."cust"."custname" IS NOT NULL) then 1 else 0)

Predicates are handled in a similar manner. For example, in the operator given below,
EXISTSNODE(po_col, 'PO/CUSTOMER[CUSTOMERNO=20]/CUSTOMERNAME') the predicate, D=20 is treated as if the user specified, (A/B/D=20)

Thus the whole expression becomes,
CASE (WHEN ("PO"."CUST"."CUSTNAME" IS NOT NULL
  AND ("PO"."CUST"."CUSTNO"=20)) THEN 1 ELSE 0)

Collection Traversals

The XPath expressions may also span collection constructs and the queries are still rewritten by using subqueries on the collection tables. For example,
EXISTSNODE(po_col, '/PO/lineitems[lineitemno=20]') is checking for the existance of lineitems in a purchase order where the lineitem number is 20. This becomes,
  case(when (exists(select * from TABLE("po"."lineitems") where lineitemno=20)) then 1 else 0)

Default Tables

As part of schema registration, default tables can also be created. The default table is most useful in cases when XML instance documents conforming to this schema are inserted through APIs that do not have any table specification e.g. FYP, HTTP. In such case, the XML instance is inserted into the default table.

If the user has given a value for defaultTable attribute, the XMLType table is created with that name. Else, it gets created with some internally generated name. Further, any text specified as the tableStorage attribute is appended to the generated CREATE TABLE statement.

Specifying the Internal Memory Datatype

The XML data is stored in a C structure within RDBMS memory. In general, the in-memory representation of the XML data is such that it tries to avoid datatype conversions at load time, and converts data only when accessed, since many parts of the document may not be accessed at all. As part of schema registration, the in-memory datatype is chosen based on the XML datatype—and this information is stored within the schema document using the memDatatype attribute. However, there are some scenarios in which an application may wish to override the default memory type in favor of a different in-memory representation.

Eg. the default memory representation of strings is "char" which keeps the string data in the database session character set. However, if this data is only consumed by a Java application that requires it in Fixed Width UCS-2 Unicode, it may be more performant to set the memDatatype to "JavaString". This ensures that database server 104 keeps the data directly in Java memory in Unicode format—thereby avoiding any format conversions or copies.

elements of the appropriate database representation and the elements identified in the particular XML schema. For example, if the appropriate database representation for an XML schema for type "person" includes a table PERSON for storing the data items contained in person XML documents, then the mapping information would indicate a correlation between person XML documents and table PERSON.

In addition to the general correlation between an XML schema and a database schema object (such as a table), the mapping information may reflect correlations at much finer levels of granularity. For example, the mapping information may indicate which specific column of the PERSON table should be used to store each specific data item within person XML documents.

According to one embodiment, the information regarding the SQL mapping is itself stored within the XML schema document. During the registration process, the XML schema mapper 106 generates the SQL types (as shown above). In

| XML Datatype | Allowed Memory Datatypes | Description | Default |
|---|---|---|---|
| String | Char | Varying width character data in character set currently active for this session. | Yes |
| | JavaString | Fixed width UCS-2 Unicode allocated from JServer memory. | No |
| Integer | integer | Signed 8 byte native integer by default; if XML schema specifies max & min values, a smaller or unsigned datatype may be used | Yes |
| | number | Oracle number format | No |
| float | float | Native maximum precision floating point; smaller value may be used if max & min are specified within range of smaller type | Yes |
| | number | Oracle number format | No |

Generation of Mapping Information

Once the appropriate database representation has been determined for a particular XML schema, mapping information is generated to indicate the correlation between the addition it adds annotations to the XML schema document to store the mapping information. Annotations are in form of new attributes. Example: The schema below shows the SQL mapping information captured via SQLType and SQLName attributes.

```
<schema xmlns="http://www.w3.org/2001/XMLSchema"
targetNamespace="http://www.oracle.com/PO.xsd">
    <complexType name = "PurchaseOrder">
        <attribute name = "PurchaseDate" type = "date" SQLName="PURCHASEDATE" SQLType="DATE"/>
        <sequence>
            <element name = "PONum" type = "decimal" SQLName="PONUM" SQLType="NUMBER"/>
            <element name = "Company" type = "string" maxLength = "100" SQLName="COMPANY" SQLType="VARCHAR2"/>
            <element name = "Item" maxOccurs = "1000" SQLName="ITEM" SQLType="ITEM_T" SQLCollType="ITEM_VARRAY_T">
                <complexType>
                    <sequence>
                        <element name = "Part" type = "string" maxLength = "1000" SQLName="PART" SQLType="VARCHAR2"/>
                        <element name = "Price" type = "float" SQLName="PRICE" SQLType="NUMBER"/>
                    </sequence>
                </complexType>
            </element>
        </sequence>
    </complexType>
    <element name="PO" type="PurchaseOrder" SQLType="PURCHASEORDER_T"/>
</schema>
```

User-Specified Names in Input Schema Document

The user can specify the names of the SQL object types and its attributes by filling in the SQLName and SQLType attributes prior to registering the schema. If the SQLName and SQLType values are specified by the user, then the XML schema mapper 106 creates the SQL object types using these names. If these attributes are not specified by the user, an internal name-generation algorithm is used to generate the names. See Appendix for details on the name generation algorithm.

The table below lists all the annotations used within the schema to capture the SQL mapping information. Note that the user need not specify values for any of these attributes. The XML schema mapper 106 will fill in the appropriate values during the schema registration process. However, it is recommended that user specify the names of at least the top level SQL types—in order to be able to reference them later. All annotations are in form of attributes that can be specified within attribute and element declarations. These attributes belong to the XDB namespace:
http://xmlns.oracle.com/xdb/YDBSchema.xsd

TABLE 1

XDB attributes specifiable within element and attribute declarations

| Attribute | Values | Default | Description |
|---|---|---|---|
| SQLName | Any SQL identifier | element name | This attribute specifies the name of the attribute within the SQL object that maps to this XML element. |
| SQLType | Any SQL type name | Name generated from element name | This property specifies the name of the SQL Type corresponding to this XML element or attribute. This could refer to a scalar or object type depending on the XML schema declaration. |
| SQLCollType | Any SQL Collection type name | Name generated from element name | This specifies the name of the SQL collection type corresponding to this XML element that has maxOccurs > 1. |
| SQLSchema | Any SQL user name | User registering XML schema | Name of database user owning the type specified by SQLType |
| SQLCollSchema | Any SQL user name | User registering XML schema | Name of database user owning the type specified by SQLCollType. |
| maintainOrder | true | false | true | If "true", the collection is mapped to a VARRAY. Else, the collection is mapped to a NESTED TABLE. |
| storeVarrayAsLob | true | false | true | If "true", the VARRAY is stored in a LOB. If "false", the varray is stored as a table (OCT). |
| SQLInline | true | false | true | If "true" this element is stored inline as an embedded attribute (or a collection if maxOccurs > 1). If "false", a REF (or collection of REFs if maxOccurs > 1) is stored. This attribute will be forced to "false" in certain situations (like cyclic references) where SQL will not support inlining. |
| maintainDOM | true | false | true | If "true", instances of this element are stored such that they retain DOM fidelity on output. This implies that all comments, processing instructions, namespace declarations, etc are retained in addition to the ordering of elements. If "false", the output need not be guaranteed to have the same DOM behavior as the input. |
| tableStorage | any valid storage clause text | NULL | This attribute specifies the storage clause that is appended to the default table creation statement. It is meaningful mainly for elements that get mapped to tables viz. top-level element declarations and out-of-line element declarations. |
| defaultTable | Any table name | Based on element name. | This attribute specifies the name of the table into which XML instances of this schema should be stored. This is most useful in cases when the XML is being inserted from APIs where table name is not specified e.g. FTP, HTTP. |
| defaultACL | Any URL pointing to a ACL document | NULL | This attribute specifies the URL of the ACL that should be applied by default to all instances of this element [Folder-FS]. |
| isFolder | true | false | false | If true, instances of this element can be used as a folder (or container) within XDB [Folder-FS]. |

TABLE 1-continued

XDB attributes specifiable within element and attribute declarations

| Attribute | Values | Default | Description |
|---|---|---|---|
| mapStringToNCHAR | true \| false | false | If "true", all XML strings get mapped to NVARCHAR2 (or NCLOB) datatype. unless explicitly overridden at the element level. If "false", all XML string elements/attributes are mapped to varchar2 columns. |
| memDatatype | in-memory datatype | internal | This attribute can be used to override the default in-memory mapping of (simple) elements and attributes. See below for the table of allowed memory datatypes for a given XML datatype. |

Hybrid Storage Models

According to one embodiment, the XML schema mapper 106 is implemented to support hybrid storage models in which the structure of some elements defined within the XML schema is maintained in the appropriate database representation, and the structure of other elements is not. For example, the most-often queried/updated portions of an XML document type may be mapped to object type attributes, while the rest of the portions of the XML document are stored together in a CLOB. According to one embodiment, the specific portions for with structure is to be maintained or not to be maintained are designated by pre-annotating the XML schema with appropriate mapping directives.

Transactional Nature of XML Schema Registration

According to one embodiment, the XML schema registration is performed using the transaction support of database server 104 in a manner that allows executing compensating action to undo partial effects when errors are encountered during the schema registration operation.

Handling Cyclic Definitions in XML Schemas

It is possible for XML schemas to include cycles. According to one embodiment, XML schema mapper 106 is configured to detect such cycles and break them by using REFs while mapping to SQL object types. A detailed description of how REFs may be used to break cycles is provided in Appendix I.

Storing XML Documents Based on the Mapping Information

After an XML schema for a particular document type has been registered with database server 104, XML documents that conform with the schema can be intelligently managed by database server 104. According to one embodiment, when a protocol indicates that a resource must be stored in a database managed by database server 104, database server 104 checks the document's file name extension for .xml, .xsl, .xsd, and so on. If the document is XML, a pre-parse step is performed, where enough of the resource is read to determine the XML schemaLocation and namespace of the root element in the document. This location is used to look for a registered schema with that schemaLocation URL. If a registered schema is located with a definition for the root element of the current document, then the default table specified for that element is used to store that resource's contents.

According to one embodiment, when an XML document is stored in a database server that supports the XML schema registration techniques described herein, the database server is able to validate the documents to verify that they confirm to the corresponding XML schema. The validation may include validation of both the structure and the datatypes used by the XML document.

Various other benefits are achieved through the use of the techniques described herein. For example, the schema registration process allows the database server to enforce the integrity constraints and other forms of constraints on the XML documents and the tables used to store them. In addition, the database server is able to create indexes on and partition XML tables based on XML data.

Because the structure of the XML documents is reflected in how the data from the XML documents are stored within the database, the tag information typically used to reflect the structure does not need to be stored along with the data. The ability to avoid storing some or all of the XML tags can result in a significant decrease in storage overhead, since the XML tags often form a large portion of the size of XML documents.

Other performance benefits are also made possible. For example, query performance may be improved by rewriting XPath queries to directly access the underlying columns. In addition, update performance may be improved by rewriting updates to directly update the underlying columns. Consequently, updating a portion of the XML data from a stored document would not always require the rewriting the entire XML data for the stored document.

Hardware Overview

Figure 2:
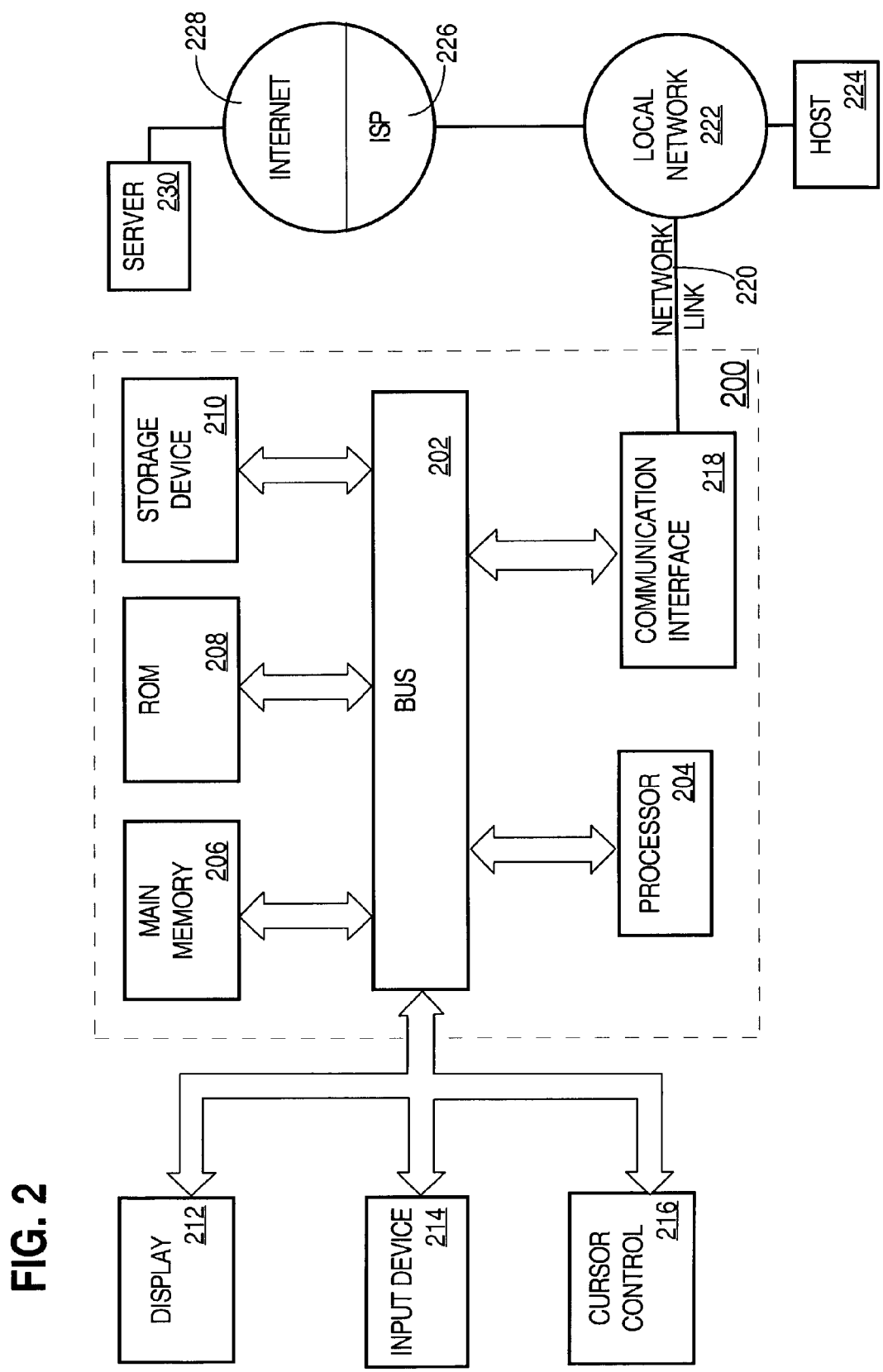
FIG. 2 is a block diagram illustrating a computer system on which embodiments of the present invention may be implemented.
Figure 3:
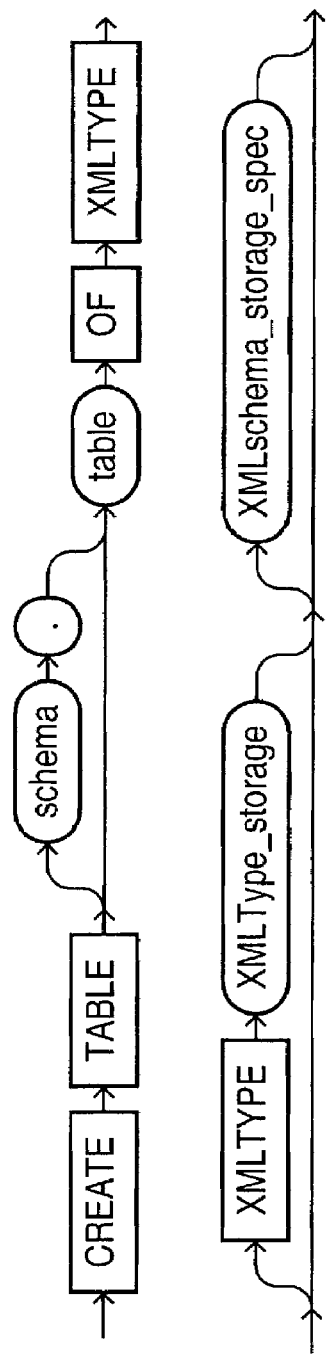
FIG. 3 is a block diagram showing syntax for creating an XML type table, according to an embodiment of the invention.
Figure 4:
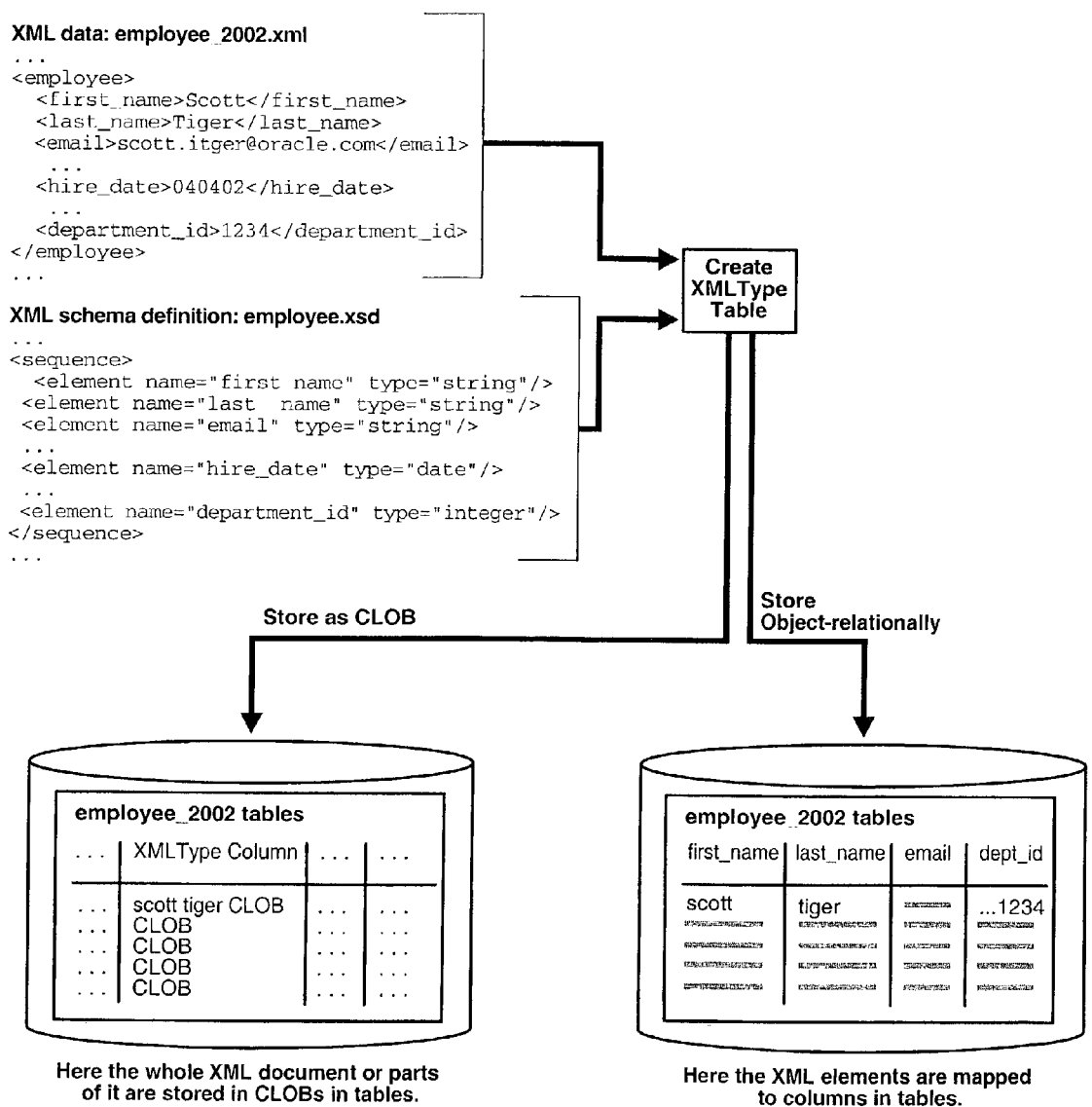
FIG. 4 is a block diagram showing a database system configured to create database objects for an appropriate database representation for documents conform to a particular XML schema, according to an embodiment of the invention.
Figure 5:
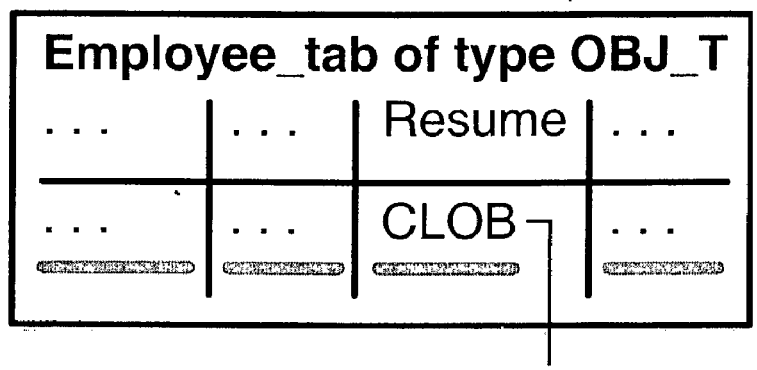
FIG. 5 is a block diagram showing that XML strings are selectively mapped to two alternative database-supported datatypes.
Figure 6:
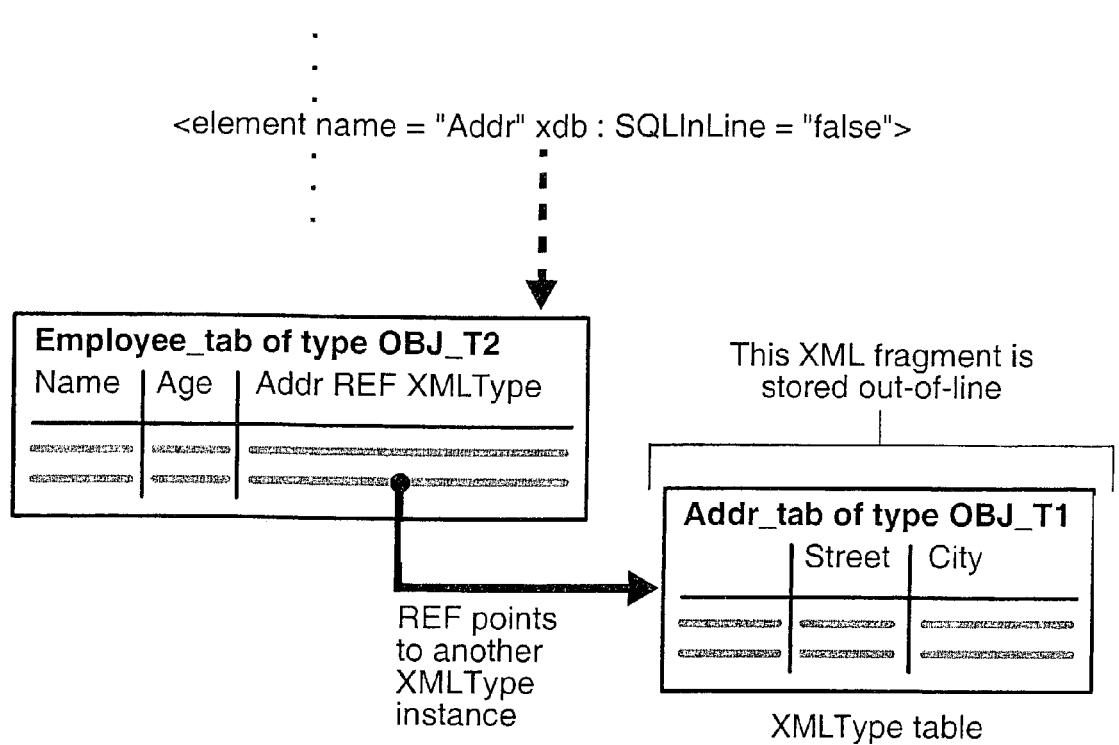
FIG. 6 shows a complexType being mapped to SQL for out-of-line storage.
Figure 8:
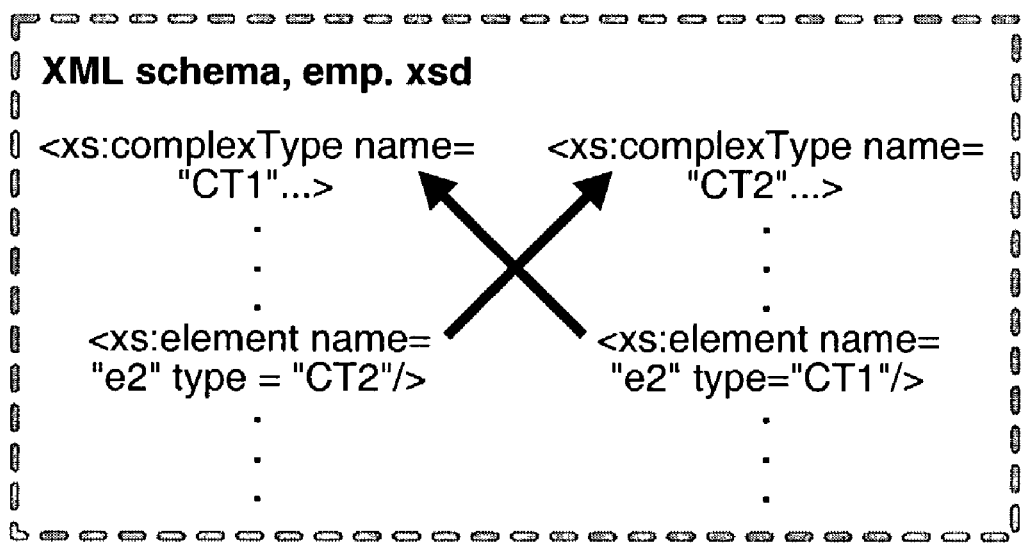
FIG. 8 shows cross-referencing between complexTypes in the same XML schema.
Figure 9:
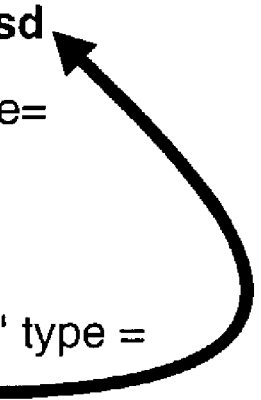
FIG. 9 is a block diagram showing complexType self-referencing within an XML schema.
Figure 10:
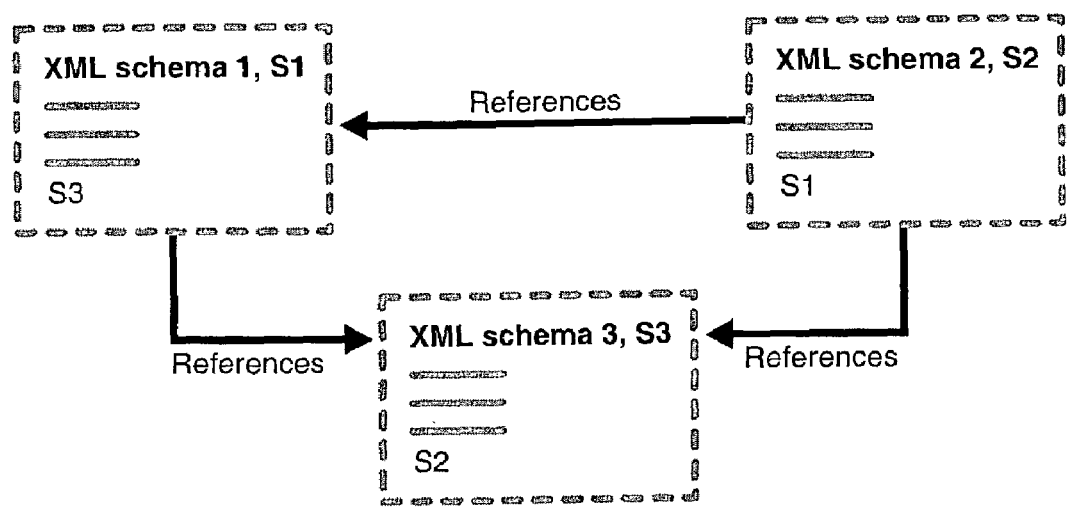
FIG. 10 is a block diagram showing cyclical references between XML schema.
Figure 10:
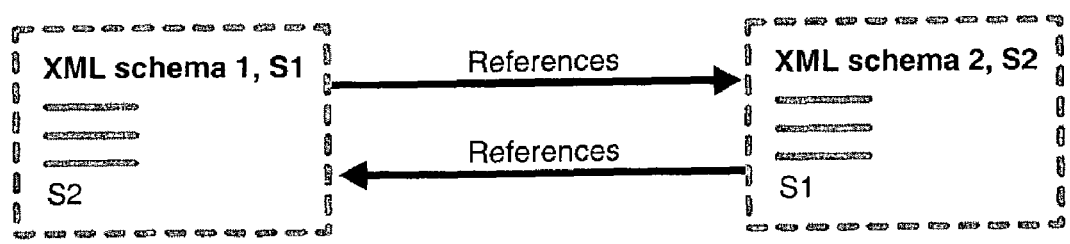

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing data in a database server, the method comprising the steps of:

determining, within the database server, an appropriate database representation for storing within said database server documents that conform to an XML schema;

generating mapping data that indicates correlations between elements of said XML schema and elements of said appropriate database representation;

wherein the step of determining an appropriate database representation includes mapping datatypes associated with elements in said XML schema to datatypes supported by said database server;

creating structures within a database based on said appropriate database representation;

storing in said structures data from XML documents that conform to said XML schema; and wherein the step of storing in said structures data from XML documents includes the steps of:
receiving an XML document at said database server, identifying certain data, from said XML document, that is associated with individual elements of said XML schema, and
storing the certain data that is associated with individual elements at locations within said structures based on the individual elements associated with the certain data, and the mapping data.

2. The method of claim 1 wherein:
the step of determining an appropriate database representation includes determining, based on user-specified information, that an element of said XML schema is to be mapped to a single CLOB without generating other object types within said database server for said element; and
the step of generating mapping data includes generating data that maps said element to said single CLOB.

3. The method of claim 2 further comprising the step of receiving said user-specified information in the form of user-specified annotations to said XML schema.

4. The method of claim 1 wherein:
the step of determining an appropriate database representation includes determining, based on user-specified information, that a first set of subelements of an element of said XML schema is to be mapped to a single CLOB; and
the step of generating mapping data includes generating data that maps said first set of subelements to said single CLOB, and generating data that maps a second set of subelements of said element to one or more objects other than said CLOB.

5. The method of claim 1 wherein the step of determining an appropriate database representation includes defining an SQL object type that includes attributes that correspond to elements in said XML schema.

6. The method of claim 1 wherein the step of mapping datatypes includes the steps of:
if a particular datatype associated with an element in said XML schema is associated with a first length, then mapping said particular datatype to a first database datatype; and
if said particular datatype is associated with a second length, then mapping said particular datatype to a second database datatype, wherein the first database datatype is different than said second database datatype.

7. The method of claim 1 wherein the step of determining an appropriate database representation includes mapping a particular element of said XML schema to a collection type supported by the database server if the particular element is defined to have a maximum number of occurrences greater than one.

8. The method of claim 7 wherein the collection type is an array type, wherein the cardinality of the array type is selected based on the maximum number of occurrences specified for said particular database element.

9. The method of claim 1 wherein the step of determining an appropriate database representation includes defining a constraint in said appropriate database representation based upon a constraint specified in said XML schema for an element of said XML schema.

10. The method of claim 9 wherein the step of defining a constraint includes defining a constraint from a set consisting of: a uniqueness constraint, a referential constraint, and a not null constraint.

11. The method of claim 1 wherein:
a first datatype is associated with an element in the XML schema;
the XML schema specifies that said first datatype inherits from a second datatype; and
the step of determining an appropriate database representation includes defining within said database server a subtype of an object type, wherein said object type corresponds to said second datatype.

12. The method of claim 1 wherein the step of determining an appropriate database representation includes:
mapping a first set of elements in said XML schema to database structures that maintain each element in the first set separate from the other elements in the first set; and
mapping a second set of elements in said XML schema to a database structure in which all elements in said second set of elements are combined as a single undifferentiated database element.

13. The method of claim 12 wherein the database server determines membership of said first set and membership of said second set based on directives associated with said XML schema.

14. The method of claim 12 wherein elements in the first set of elements are selected to be in said first set based on a likelihood that said elements will be accessed more frequently than the elements selected to be in said second set of elements.

15. The method of claim 1 wherein:
the steps of determining an appropriate database representation and generating mapping data are preformed as part of an XML schema registration operation that causes modifications within said database server; and
the method further comprises the step of automatically removing all modifications caused by said XML schema registration operation in response to encountering a particular error during said XML schema registration operation.

16. The method of claim 1 wherein the step of determining an appropriate database representation includes determining how to break cycles in said XML schema.

17. The method of claim 1 wherein:
said XML schema includes a cyclic definition involving a plurality of components; and
the step of determining how to break cycles includes causing each component of the cyclic definition to hold pointers to all of its children components.

18. The method of claim 1 wherein the step of determining how to break cycles includes causing an entire cyclic definition to be mapped for storage as a single CLOB within the database server.

19. The method of claim 1 wherein the step of generating mapping data includes adding annotations to said XML schema, and storing said annotated XML schema within said database server.

20. The method of claim 1 further comprising the step of validating, within said database server, said XML schema to determine whether the XML schema conforms to an XML schema for XML schemas.

21. The method of claim 1 wherein the step of determining is performed as part of an XML schema registration operation that is initiated in response to receiving, at said database server, said XML schema.

22. The method of claim 21 wherein:
the XML schema includes user-specified annotations that indicate how the database server should map at least one element of the XML schema; and
at least a portion of the mapping data reflects said user-specified annotations.

23. The method of claim 1 wherein the step of determining is performed as part of an XML schema registration operation that is initiated in response to receiving, at said database server, an XML document that conforms to said XML schema.

24. A method for executing database commands that involve operations on extensible markup language (XML) constructs, comprising the steps of:
a database server receiving a database command that includes an XML component operation that operates on an XML construct that is based on a first set of one or more relational database constructs;
said database server determining whether to transform the XML component operation to a relational database operation that does not involve the XML component operation and that operates on a particular set of one or more relational database constructs of the first set of one or more relational database constructs; and
in response to said database server determining to transform the XML component operation to a relational database operation that does not involve the XML component operation, said database server:
rewriting the XML component operation as a particular relational database operation that does not involve the XML component operation, and
evaluating the particular relational database operation on the particular set of one or more relational database constructs.

25. The method of claim 24, wherein the first set of one or more relational database constructs are XML types based on a XML schema stored in the relational database.

26. The method of claim 24, said step of determining whether to transform the XML component operation-to a relational database operation further comprising determining whether an included XPath expression in the XML component operation is at least one of:
a simple XPath expression that steps along only XML nodes on child axes and attribute axes, wherein each XML node corresponds to an object type column or a scalar type column;
a collection traversal expression that steps along only XML nodes on child axes and attribute axes, wherein at least one XML node corresponds to a collection type column;
a wildcard axis expression that results in XML nodes that can all be coerced to a same data type; and
a descendent axis expression that results in XML nodes that can all be coerced to a same data type.

27. The method of claim 26, said step of determining whether to transform the XML component operation-to a relational database operation further comprising determining whether the included XPath expression is used by a structured query language (SQL)/XML function.

28. The method of claim 27, wherein the SQL/XML function is at least one of EXISTSNODE, EXTRACT, and EXTRACT VALUE.

29. The method of claim 27, said step of determining whether to transform the XML component operation to a relational database operation further comprising determining whether the included XPath expression is used by the SQL/XML function in an SQL query in at least one of a SELECT list, a WHERE clause predicate, a GROUP BY expression, an ORDER BY expression, a FROM clause, and a HAVING clause.

30. The method of claim 27, said step of determining whether to transform the XML component operation to a relational database operation further comprising determining whether the included XPath expression is used by the SQL/XML function in an INDEX clause of an SQL CREATE INDEX command.

31. The method of claim 26, said step of rewriting the XML component operation further comprising rewriting a simple XPath traversal as at least one of an SQL object type accessor and an SQL scalar type accessor.

32. The method of claim 24, said step of rewriting the XML operation further comprising rewriting a predicate in an included XPath expression as a predicate in an SQL WHERE clause.

33. The method of claim 24, said step of rewriting the XML component operation further comprising rewriting an EXISTSNODE function of an XPath expression in the database command as an IS NOT NULL test on an object type corresponding to a target of the XPath expression.

34. The method of claim 24, said step of rewriting the XML component operation further comprising rewriting a XPath traversal of a collection as a sub-query on a collection table corresponding to the collection.

35. The method of claim 34, said step of rewriting the XML component operation further comprising adding a predicate in the XPath traversal of the collection to a WHERE clause of the sub-query on the collection table.

36. The method of claim 24, said step of determining whether to transform the XML component operation to a relational database operation further comprising expanding the XML component operation to a tree of XPath operators that each represent one location step in an XPath expression included in the XML component operation.

37. A computer-readable storage medium carrying one or more sequences of instructions for managing data in a database server, wherein execution of the one or more sequences of instructions by one or more processors causes the one or more processors to perform the steps of:
determining, within the database server, an appropriate database representation for storing within said database server documents that conform to an XML
generating mapping data that indicates correlations between elements of said XML schema and elements of said appropriate database representation
wherein the step of determining an appropriate database representation includes mapping datatypes associated with elements in said XML schema to datatypes supported by said database server;
creating structures within a database based on said appropriate database representation;
storing in said structures data from XML documents that conform to said XML schema; and wherein the step of storing in said structures data from XML documents includes the steps of:
- receiving an XML document at said database server,
- identifying certain data, from said XML document, that is associated with individual elements of said XML schema, and
- storing the certain data that is associated with individual elements at locations within said structures based on the individual elements associated with the certain data, and the mapping data.

38. The computer-readable storage medium of claim 37 wherein:
- the step of determining an appropriate database representation includes determining, based on user-specified information, that an element of said XML schema is to be mapped to a single CLOB without generating other object types within said database server for said element; and
- the step of generating mapping data includes generating data that maps said element to said single CLOB.

39. The computer-readable storage medium of claim 38 the steps further comprising the step of receiving said user-specified information in the form of user-specified annotations to said XML schema.

40. The computer-readable storage medium of claim 37 wherein:
- the step of determining an appropriate database representation includes determining, based on user-specified information, that a first set of subelements of an element of said XML schema is to be mapped to a single CLOB; and
- the step of generating mapping data includes generating data that maps said first set of subelements to said single CLOB, and generating data that maps a second set of subelements of said element to one or more objects other than said CLOB.

41. The computer-readable storage medium of claim 37 wherein the step of determining an appropriate database representation includes defining an SQL object type that includes attributes that correspond to elements in said XML schema.

42. The computer-readable storage medium of claim 37 wherein the step of mapping datatypes includes:
- if a particular datatype associated with an element in said XML schema is associated with a first length, then mapping said particular datatype to a first database datatype; and
- if said particular datatype is associated with a second length, then mapping said particular datatype to a second database datatype, wherein the first database datatype is different than said second database datatype.

43. The computer-readable storage medium of claim 37 wherein the step of determining an appropriate database representation includes mapping a particular element of said XML schema to a collection type supported by the database server if the particular element is defined to have a maximum number of occurrences greater than one.

44. The computer-readable storage medium of claim 43 wherein the collection type is an array type, wherein the cardinality of the array type is selected based on the maximum number of occurrences specified for said particular database element.

45. The computer-readable storage medium of claim 37 wherein the step of determining an appropriate database representation includes defining a constraint in said appropriate database representation based upon a constraint specified in said XML schema for an element of said XML schema.

46. The computer-readable storage medium of claim 45 wherein the step of defining a constraint includes defining a constraint from a set consisting of: a uniqueness constraint, a referential constraint, and a not null constraint.

47. The computer-readable storage medium of claim 37 wherein:
- a first datatype is associated with an element in the XML schema;
- the XML schema specifies that said first datatype inherits from a second datatype; and
- the step of determining an appropriate database representation includes defining within said database server a subtype of an object type, wherein said object type corresponds to said second datatype.

48. The computer-readable storage medium of claim 37 wherein the step of determining an appropriate database representation includes:
- mapping a first set of elements in said XML schema to database structures that maintain each element in the first set separate from the other elements in the first set; and
- mapping a second set of elements in said XML schema to a database structure in which all elements in said second set of elements are combined as a single undifferentiated database element.

49. The computer-readable storage medium of claim 48 wherein the database server determines membership of said first set and membership of said second set based on directives associated with said XML schema.

50. The computer-readable storage medium of claim 48 wherein elements in the first set of elements are selected to be in said first set based on a likelihood that said elements will be accessed more frequently than the elements selected to be in said second set of elements.

51. The computer-readable storage medium of claim 37 wherein:
- the steps of determining an appropriate database representation and generating mapping data are preformed as part of an XML schema registration operation that causes modifications within said database server; and
- the steps further comprise the step of automatically removing all modifications caused by said XML schema registration operation in response to encountering a particular error during said XML schema registration operation.

52. The computer-readable storage medium of claim 37 wherein the step of determining an appropriate
- database representation includes determining how to break cycles in said XML schema.

53. The computer-readable storage medium of claim 37 wherein:
- said XML schema includes a cyclic definition involving a plurality of components; and
- the step of determining how to break cycles includes causing each component of the cyclic definition to hold pointers to all of its children components.

54. The computer-readable storage medium of claim 37 wherein the step of determining how to break cycles includes causing an entire cyclic definition to be mapped for storage as a single CLOB within the database server.

55. The computer-readable storage medium of claim 37 wherein the step of generating mapping data includes adding annotations to said XML schema, and storing said annotated XML schema within said database server.

56. The computer-readable storage medium of claim 37 the steps further comprising the step of validating, within said database server, said XML schema to determine whether the XML schema conforms to an XML schema for XML schemas.

57. The computer-readable storage medium of claim 37 wherein the step of determining is performed as part of an XML schema registration operation that is initiated in response to receiving, at said database server, said XML schema.

58. The computer-readable storage medium of claim 57 wherein:
the XML schema includes user-specified annotations that indicate how the database server should map at least one element of the XML schema; and
at least a portion of the mapping data reflects said user-specified annotations.

59. The computer-readable storage medium of claim 37 wherein the step of determining is performed as part of an XML schema registration operation that is initiated in response to receiving, at said database server, an XML document that conforms to said XML schema.

60. A computer-readable storage medium carrying one or more sequences of instructions for executing database commands that involve operations on extensible markup language (XML) constructs, wherein execution of the one or more sequences of instructions by one or more processors causes the to perform the steps of:
database server receiving a database command that includes an XML component operation that operates on an XML construct that is based on a first set of one or more relational database constructs;
said database server determining whether to transform the XML component operation to a relational database operation that does not involve the XML component operation and that operates on a particular set of one or more relational database constructs of the first set of one or more relational database constructs; and
in response to said database server determining to transform the XML component operation to a relational database operation that does not involve the XML component operation, said database server:
rewriting the XML component operation as a particular relational database operation that does not involve the XML component operation, and
evaluating the particular relational database operation on the particular set of one or more relational database constructs.

61. The computer-readable storage medium of claim 60, wherein the first set of one or more relational database constructs are XML types based on a XML schema stored in the relational database.

62. The computer-readable storage medium of claim 60, said step of determining whether to transform the XML component operation-to a relational database operation further comprising determining whether an included XPath expression in the XML component operation is at least one of:
simple XPath expression that steps along only XML nodes on child axes and attribute axes, wherein each XML node corresponds to an object type column or a scalar type column;
a collection traversal expression that steps along only XML nodes on child axes and attribute axes, wherein at least one XML node corresponds to a collection type column;
a wildcard axis expression that results in XML nodes that can all be coerced to a same data type; and
a descendent axis expression that results in XML nodes that can all be coerced to a same data type.

63. The computer-readable storage medium of claim 62, said step of determining whether to transform the XML component operation to a relational database operation further comprising determining whether the included XPath expression is used by a structured query language (SQL)/XML function.

64. The computer-readable storage medium of claim 63, wherein the SQL/XML function is at least one of EXISTSNODE, EXTRACT, and EXTRACTVALUE.

65. The computer-readable storage medium of claim 63, said step of determining whether to transform the XML component operation to a relational database operation further comprising determining whether the included XPath expression is used by the SQL/XML function in an SQL query in at least one of a SELECT list, a WHERE clause predicate, a GROUP BY expression, an ORDER BY expression, a FROM clause, and a HAVING clause.

66. The computer-readable storage medium OF claim 63, said step of determining whether to transform the XML component operation to a relational database operation further comprising determining whether the included XPath expression is used by the SQL/XML function in an INDEX clause of an SQL CREATE INDEX command.

67. The computer-readable storage medium of claim 62, said step of rewriting the XML component operation further comprising rewriting a simple XPath traversal as at least one of an SQL object type accessor and an SQL scalar type accessor.

68. The computer-readable storage medium of claim 60, said step of rewriting the XML operation further comprising rewriting a predicate in an included XPath expression as a predicate in an SQL WHERE clause.

69. The computer-readable storage medium of claim 60, said step of rewriting XML component operation further comprising rewriting an EXISTSNODE function of an XPath expression in the database command as an IS NOT NULL test on an object type corresponding to a target of the XPath expression.

70. The computer-readable storage medium of claim 60, said step of rewriting the XML component operation further comprising rewriting a XPath traversal of a collection as a sub-query on a collection table corresponding to collection.

71. The computer-readable storage medium of claim 70, said step of rewriting the XML component operation further comprising adding a predicate in the XPath traversal of the collection to a WHERE clause of the sub-query on the collection table.

72. The computer-readable storage medium of claim 60, said step of determining whether to transform the XML component operation to a relational database operation further comprising expanding the XML component operation to a tree of XPath operators that each represent one location step in an XPath expression included in the XML component operation.

* * * * *

UNITED STATES PATENT AND TRADEMARK OFFICE
CERTIFICATE OF CORRECTION

PATENT NO. : 7,096,224 B2
APPLICATION NO. : 10/259278
DATED : August 22, 2006
INVENTOR(S) : Ravi Murthy et al.

It is certified that error appears in the above-identified patent and that said Letters Patent is hereby corrected as shown below:

Col. 31, line 47, delete "operation-" and insert --operation--

Col, 31, line 64, delete "operation-" and insert --operation--

Col. 32, line 3 delete "EXTRACT VALUE" arid insert --EXTRACTVALUE--

Col. 32, line 55, after "XML" insert --schema;--

Col. 32, line 58, delete "representation" and insert --representation;--

Col. 35, line 28, after "the" insert --one or more processors--

Col. 35, line 29, before "database" insert --a--

Col. 35, line 55, delete "operation-" and insert--operation--

Signed and Sealed this

Nineteenth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 7,096,224 B2
APPLICATION NO. : 10/259278
DATED : August 22, 2006
INVENTOR(S) : Ravi Murthy et al.

Page 1 of 1

It is certified that error appears in the above-identified patent and that said Letters Patent is hereby corrected as shown below:

Col. 31, line 47, delete "operation-" and insert --operation--

Col, 31, line 64, delete "operation-" and insert --operation--

Col. 32, line 3 delete "EXTRACT VALUE" and insert --EXTRACTVALUE--

Col. 32, line 55, after "XML" insert --schema;--

Col. 32, line 58, delete "representation" and insert --representation;--

Col. 35, line 28, after "the" insert --one or more processors--

Col. 35, line 29, before "database" insert --a--

Col. 35, line 55, delete "operation-" and insert--operation--

This certificate supersedes Certificate of Correction issued December 19, 2006.

Signed and Sealed this

Twenty-seventh Day of March, 2007

JON W. DUDAS
*Director of the United States Patent and Trademark Office*